US012671243B2

(12) United States Patent
Popek et al.

(10) Patent No.: US 12,671,243 B2
(45) Date of Patent: Jun. 30, 2026

(54) MOTOR TERMINAL SNUBBING CIRCUIT

(71) Applicant: Hamilton Sundstrand Corporation, Charlotte, NC (US)

(72) Inventors: Grzegorz Popek, Birmingham (GB); Ignacio Castro Álvarez, Gijón (ES)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 255 days.

(21) Appl. No.: 18/455,185

(22) Filed: Aug. 24, 2023

(65) Prior Publication Data

US 2024/0072532 A1 Feb. 29, 2024

(30) Foreign Application Priority Data

Aug. 30, 2022 (EP) ..................................... 22275119

(51) Int. Cl.
*H02H 7/08* (2006.01)

(52) U.S. Cl.
CPC ................................. *H02H 7/0833* (2013.01)

(58) Field of Classification Search
CPC ...... H02P 3/22; H02P 29/028; H02P 29/0241; H02M 1/348; H02M 7/5387
See application file for complete search history.

(56) References Cited

U.S. PATENT DOCUMENTS

| | | | |
|---|---|---|---|
| 6,122,184 A | 9/2000 | Enjeti et al. | |
| 6,208,537 B1 | 3/2001 | Skibinski et al. | |

| | | | | |
|---|---|---|---|---|
| 6,653,806 B1 * | 11/2003 | Ono | .......................... | H02P 3/22 |
| | | | | 318/378 |
| 6,738,239 B2 | 5/2004 | Petruska | | |
| 7,177,128 B2 * | 2/2007 | Yamamoto | ............ | H02M 7/003 |
| | | | | 257/E25.024 |
| 7,479,756 B2 * | 1/2009 | Kasunich | .................. | H02P 3/22 |
| | | | | 318/820 |
| 8,325,455 B2 * | 12/2012 | Divan | .................... | H02H 9/042 |
| | | | | 361/118 |

(Continued)

FOREIGN PATENT DOCUMENTS

WO              9613091 A1       5/1996

OTHER PUBLICATIONS

A. F. Moreira, et al., "Filter Networks for Long Cable Drives and Their Influence on Motor Voltage Distribution and Common-Mode Currents," IEEE Transactions on Industrial Electronics, vol. 52, No. 2, pp. 515-522, Apr. 2005.

(Continued)

*Primary Examiner* — Rina I Duda
(74) *Attorney, Agent, or Firm* — CANTOR COLBURN LLP

(57) ABSTRACT

A snubber circuit to mitigate voltage overshoot in a power train for driving a motor, the snubber circuit configured to be connected to the motor terminal between a transmission line from a power supply and converter and a motor. The snubber circuit includes a rectifier, a capacitor connected across an output of the rectifier and a load connected across the capacitor. The capacitor is rated to charge to a predetermined link voltage and wherein an input voltage to the rectifier that exceeds the link voltage causes the voltage at the motor terminal to clamp to the link voltage and for excess energy from the input voltage to be stored in the link capacitor and dissipated by the load.

7 Claims, 4 Drawing Sheets

(56)                    References Cited

U.S. PATENT DOCUMENTS

| | | | | |
|---|---|---|---|---|
| 8,502,485 | B2 * | 8/2013 | Kudanowski | ......... H02P 29/032 |
| | | | | 361/33 |
| 9,041,327 | B2 * | 5/2015 | Breitzmann | ........ H02P 29/0241 |
| | | | | 318/400.22 |
| 9,837,952 | B1 | 12/2017 | Carcia et al. | |
| 10,044,258 | B2 * | 8/2018 | Bryant | .................... H02M 5/04 |
| 2014/0368143 | A1 | 12/2014 | Breitzmann et al. | |
| 2018/0183323 | A1 * | 6/2018 | Budica | .................. H02M 3/155 |

OTHER PUBLICATIONS

A. von Jouanne, et al. "Design Considerations for an Inverter Output Filter to Mitigate the Effects of Long Motor Leads in ASD Applications," IEEE Transactions on Industry Applications, vol. 33, No. 5, pp. 1138-1145, Sep.-Oct. 1997.

D. A. Rendusara, et al. "An Improved Inverter Output Filter Configuration Reduces Common and Differential Modes dv/dt at the Motor Terminals in PWM Drive Systems," IEEE Transactions on Power Electronics, vol. 13, No. 6, pp. 1135-1143, Nov. 1998.

E. Persson, "Transient Effects in Application of PWM Inverters to Induction Motors," IEEE Transactions on Industry Applications, vol. 28, No. 5, pp. 1095-1101, Sep.-Oct. 1992.

J. C. G. Wheeler, "Effects of Converter Pulses on the Electrical Insulation in Low and Medium Voltage Motors," IEEE Electrical Insulation Magazine, vol. 21, No. 2, pp. 22-29, Mar.-Apr. 2005.

J. He, et al., "A Review of Mitigation Methods for Overvoltage in Long-Cable-Fed PWM AC Drives," 2011 IEEE Energy Conversion Congress and Exposition, Phoenix, AZ, 2011, pp. 2160-2166.

K. K. Yuen et al., "Use of Synchronous Modulation to Recover Energy Gained From Matching Long Cable in Inverter-Fed Motor Drives," IEEE Transactions on Power Electronics, vol. 29, No. 2, pp. 883-893, Feb. 2014.

K. K. Yuen, et al. "A Low-Loss "RL-Plus-C" Filter for Overvoltage Suppression in Inverter-Fed Drive System With Long Motor Cable," IEEE Transactions on Power Electronics, vol. 30, No. 4, pp. 2167-2181, Apr. 2015.

K. K. Yuen, et al., "An Active Low-Loss Motor Terminal Filter for Overvoltage Suppression and Common-Mode Current Reduction," IEEE Transactions on Power Electronics, vol. 27, No. 7, pp. 3158-3172, Jul. 2012.

N. Aoki, et al., "Damping Circuit to Suppress Motor Terminal Overvoltage and Ringing in PWM Inverter-Fed AC Motor Drive Systems with Long Motor Leads," in IEEE Transactions on Industry Applications, vol. 35, No. 5, pp. 1014-1020, Sep.-Oct. 1999.

P. Mart-ro, et al., "Analysis of dv/dt Filter Installation for PWM AC Drive Applications," 2011 IEEE Ninth International Conference on Power Electronics and Drive Systems, Singapore, 2011, pp. 177-184.

T. Shimizu, et al., "A Motor Surge Voltage Suppression Method With Surge Energy Regeneration," IEEE Transactions on Power Electronics, vol. 27, No. 7, pp. 3434-3443, Jul. 2012.

Z. Liu, et al., "Method to Reduce Overvoltage on AC Motor Insulation from Inverters with Ultra-Long Cable," 2017 IEEE International Electric Machines and Drives Conference (IEMDC), Miami, FL, 2017, pp. 1-8.

European Search Report for Application No. 22275119.0, mailed Feb. 16, 2023, 7 pages.

* cited by examiner

MOTOR TERMINAL SNUBBING CIRCUIT

CROSS REFERENCE TO RELATED APPLICATION

This application claims priority to European Patent Application No. 22275119.0 filed Aug. 30, 2022, the entire contents of which is incorporated herein by reference.

TECHNICAL FIELD

The present disclosure is concerned with arrangements for mitigating transmission line effects and addressing problems caused by voltage overshoot at converter-driven motor terminals.

BACKGROUND

Power trains typically include a power source connected to a load such as a motor via a power convertor/inverter. For example a three phase AC motor is conventionally driven from a power supply. If the power supply is AC power, a rectifier will convert the AC power to DC power on a DC link. An inverter provides the required three-phase AC power, e.g. at a different frequency from the power supply, to drive the motor, from the DC power. The drive power for the motor is often transmitted to the motor over long cables or lines.

The power cables have an inherent inductance and capacitance, and a mismatch between the cable characteristic impedance and the connected motor and other components can cause electrical reflections along the power cable. The inverter motor generates a PWM voltage pattern at the output. Sharp edges of the PWM signal interacting with the cable can cause a rapid increase in voltage creating a voltage surge at the motor terminals. These surges or spikes of current and voltage can cause so-called transmission line effects at the motor terminals. Such surges can have amplitudes of double the DC link voltage. Such phenomena are described extensively in the literature, e.g. E. Persson, "Transient effects in application of PWM inverters to induction motors," in IEEE Transactions on Industry Applications, vol. 28, no. 5, pp. 1095-1101, September-October 1992. J. C. G. Wheeler, "Effects of converter pulses on the electrical insulation in low and medium voltage motors," in IEEE Electrical Insulation Magazine, vol. 21, no. 2, pp. 22-29, March-April 2005. A. von Jouanne and P. N. Enjeti, "Design considerations for an inverter output filter to mitigate the effects of long motor leads in ASD applications," in IEEE Transactions on Industry Applications, vol. 33, no. 5, pp. 1138-1145, September-October 1997. Prasad Enjeti, Dudi Rendusara, and Annette von Jouanne, "Method and System for an Improved Converter Output Filter for an Induction Drive System", U.S. Pat. No. 6,122,184; Sep. 19, 2000. D. A. Rendusara and P. N. Enjeti, "An improved inverter output filter configuration reduces common and differential modes dv/dt at the motor terminals in PWM drive systems," in IEEE Transactions on Power Electronics, vol. 13, no. 6, pp. 1135-1143, November 1998. P. Mart-ro, W. Sae-Kok and S. Khomfoi, "Analysis of dv/dt filter installation for PWM AC drive applications," 2011 IEEE Ninth International Conference on Power Electronics and Drive Systems, Singapore, 2011, pp. 177-184. K. K. Yuen and H. S. Chung, "A Low-Loss "RL-Plus-C" Filter for Overvoltage Suppression in Inverter-Fed Drive System With Long Motor Cable," in IEEE Transactions on Power Electronics, vol. 30, no. 4, pp. 2167-2181, April 2015. N. Aoki, K. Satoh and A. Nabae, "Damping circuit to suppress motor terminal overvoltage and ringing in PWM inverter-fed AC motor drive systems with long motor leads," in IEEE Transactions on Industry Applications, vol. 35, no. 5, pp. 1014-1020, September-October 1999. A. F. Moreira, P. M. Santos, T. A. Lipo and G. Venkataramanan, "Filter networks for long cable drives and their influence on motor voltage distribution and common-mode currents," in IEEE Transactions on Industrial Electronics, vol. 52, no. 2, pp. 515-522, April 2005. J. He, G. Y. Sizov, P. Zhang and N. A. O. Demerdash, "A review of mitigation methods for overvoltage in long-cable-fed PWM AC drives," 2011 IEEE Energy Conversion Congress and Exposition, Phoenix, A Z, 2011, pp. 2160-2166.K. K. Yuen, H. S. Chung and V. S. Cheung, "An Active Low-Loss Motor Terminal Filter for Overvoltage Suppression and Common-Mode Current Reduction," in IEEE Transactions on Power Electronics, vol. 27, no. 7, pp. 3158-3172, July 2012. T. Shimizu, M. Saito, M. Nakamura and T. Miyazaki, "A Motor Surge Voltage Suppression Method With Surge Energy Regeneration," in IEEE Transactions on Power Electronics, vol. 27, no. 7, pp. 3434-3443, July 2012. K. K. Yuen and H. S. Chung, "Use of Synchronous Modulation to Recover Energy Gained From Matching Long Cable in Inverter-Fed Motor Drives," in IEEE Transactions on Power Electronics, vol. 29, no. 2, pp. 883-893, February 2014. Z. Liu and G. L. Skibinski, "Method to reduce overvoltage on AC motor insulation from inverters with ultra-long cable," 2017 IEEE International Electric Machines and Drives Conference (IEMDC), Miami, F L, 2017, pp. 1-8. These effects can cause damage to the motor windings and/or conductor insulation which can result in failure of the motor.

Today, wide band-gap rapid switching components made of SiC and GaN are often used in the converter for their improved switching properties, but these can create transmission line effects even in shorter cables. This means that the faster switching advantage of such devices is not fully exploited.

Various solutions to transmission line effects have been proposed, such as providing an oversized motor (less desirable where weight and size constraints apply such as in aircraft), or providing a passive filter (RC, RL, RLC) at the inverter output or at the motor terminals. Such solutions, however, can result in excessive loss and the need to provide a bigger heat sink which increases the weight of the converter and reduces it attractiveness.

In one approach, transmission line effects are managed by an output RLC filter which 'slows down' the edges of the PWM signal to the motor. Such an arrangement can, however, lead to losses due to power dissipation. This is particularly problematic in e.g. aerospace applications because of excessive heatsink size. The use of capacitors can also give rise to reliability concerns.

An alternative approach to handling transmission line effects is the use of an RL output filter. Such a filter dissipates less power and does not have the problems associated with capacitors.

Output filters often dissipate large amounts of energy at their resistors, which negates the benefits of the new fast-switching devices.

Other solutions involve providing active circuits that match the cable impedance while being able to generate energy. RC components are selected to provide a certain terminating resistance to avoid high frequency components, achieved by matching the resistance to the characteristic impedance of the cable. Alternatively, RC components are selected to slow the voltage rise (dv/dt) at the motor terminal to acceptable levels for twice the time delay of the transmission line. RC terminators tend to dissipate less energy than RLC circuits and so can be preferable. The use of capacitors, again, however, can give rise to reliability issues.

Another solution, found to reduce power losses, uses a sinewave filter comprising inductive and capacitive components. Such a filter is essentially lossless due to not having resistive components. Such filters are generally designed to have a cut-off frequency at the logarithmic half frequency between the grid frequency and the switching frequency. The filter is then completely independent of cable length. A problem with such a filter, though, is that the cut-off frequency requirement means that the inductor needs to be large and will be heavy, which is undesirable, particularly in aerospace applications. Such filters also have the disadvantages mentioned above due to the use of capacitors.

Another problem with known power drives is that fast dv/dt transitions can inject a large common mode (CM) current into the chassis of the system such that the system is no longer compliant with e.g. EMI requirements. Large CM current can also contribute to ageing of the motor assembly.

Most of the solutions proposed for managing transmission line effects, discussed above, will not have significant impact on the CM current.

It would be desirable to provide a filter or snubber circuit at the load end of a power train that effectively and efficiently manages transmission line effects without the problems identified above.

SUMMARY

According to the disclosure, there is provided a snubber circuit for connecting to the terminals of a motor that is driven from a power source and converter via transmission lines, the snubber circuit being configured to selectively capture overshoots only for those PWM edges that endanger motor insulation.

According to the invention, there is provided a snubber circuit to mitigate voltage overshoot in a power train for driving a motor, the snubber circuit configured to be connected to the motor terminal between a transmission line from a power supply and converter and a motor, the snubber circuit comprising a rectifier, a capacitor connected across an output of the rectifier and a load connected across the capacitor, wherein the capacitor is rated to charge to a predetermined link voltage and wherein an input voltage to the rectifier that exceeds the link voltage causes the voltage at the motor terminal to clamp to the link voltage and for excess energy from the input voltage to be stored in the link capacitor and dissipated by the load.

DETAILED DESCRIPTION

The described embodiments are by way of example only. The scope of this disclosure is limited only by the claims.

A typical power train for a motor is described with reference to FIG. 1. Power is provided from a power supply 1 to a motor 4 via a power converter 2. Typically, the converter 2 has to drive a remote motor load 4 that can be many meters away, connected by long transmission lines 3.

If the converter 2 is a PWM converter and generates sufficiently sharp dv/dt edges, part of the high frequency energy from the switching is trapped in feeder cables which can result in voltage overshoot at the motor terminal. This voltage can be much greater than converter line-to-line voltage and can lead to deterioration of the insulation of the motor turn-to-turn windings.

As described above, various solutions have been proposed to address such transmission line effects rather than having to have excessively large insulation. Some solutions have involved providing dv/dt filters at the converter output to remove the HF energy that causes the transmission line effects before it gets to the transmission line. Such filters, however, are characterised by high losses and significant weight since they are made of inductive components that need to be sized to carry large currents. Other filters using inductors have similar disadvantages. An alternative solution has been to use RC terminations at the motor terminals, thus avoiding the use of heavy inductors. The use of capacitors, tough, also presents disadvantages, particularly when used in harsh environments e.g. in aerospace or industry, where the capacitors are subject to high dv/dt stresses.

The present disclosure provides a motor terminal snubber circuit that selectively captures significant voltage overshoots.

Figure 1:
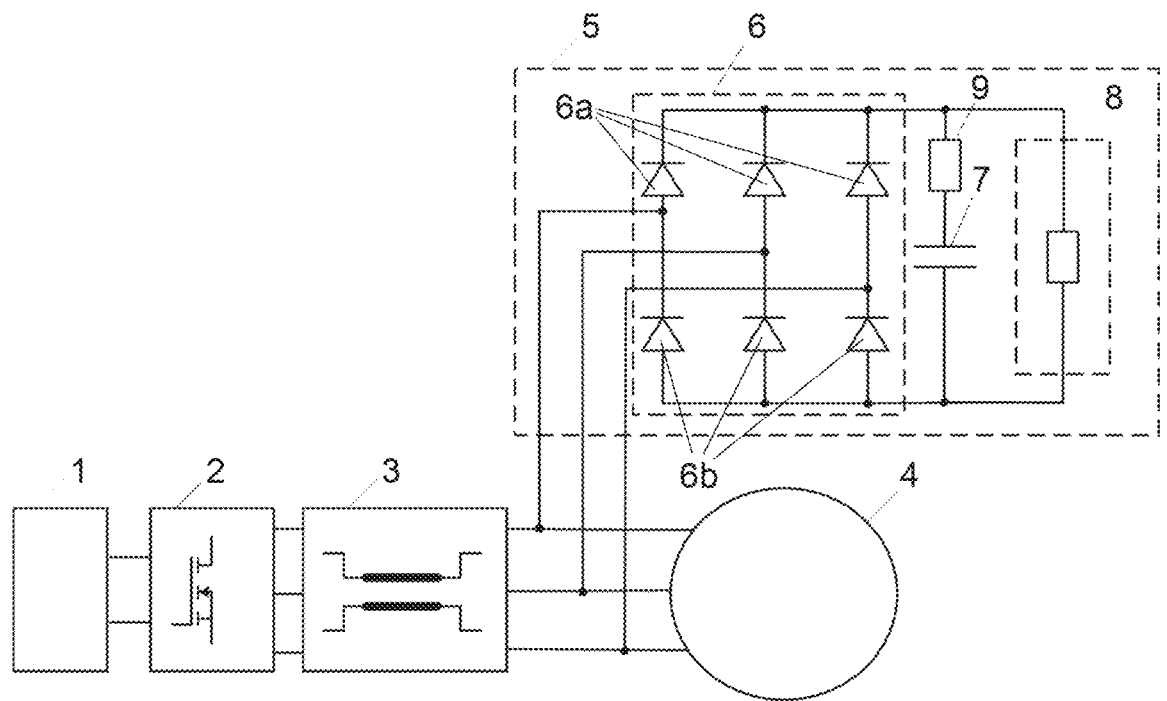
FIG. 1 is a schematic diagram of a typical power train for a motor, incorporating a snubber circuit according to this disclosure.

The snubber circuit is generally indicated, in FIG. 1, by reference numeral 5 and comprises a rectifier 6 which is at least a six-pulse rectifier but could, in theory, be multiples of 6 pulse. A capacitor 7 is connected across the output of the rectifier 6. Optionally, a resistor 9 may be placed in series with the capacitor 7 across the rectifier output. A load e.g. a resistor 8 is connected across the capacitor 7 (or, where the optional resistor 9 is present, across the series connection of the capacitor and the resistor). Whilst the load is shown here as a simple resistor, it can, in fact, be anything that is able to dissipate heat and may be e.g. a useful or functional load. The snubber circuit 5 is connected to the motor terminal.

In the event of an overshoot, high frequency energy stored in the snubber circuit 5 is dissipated by the load 8, as will be described further below. In summary, the snubber is only triggered on occurrence of a high phase-to-phase voltage event, whereupon, the capacitor and the load are connected to discharge the high voltage. Otherwise, at lower voltages, the snubber is not activated. For example, for a motor drive with a 1000V DC link voltage, when the capacitor 7 is charged up to that 1000V and slowly discharged by the load 8, the rectifier will only clamp phase-to-phase voltages if they are greater than 1000V. Such voltages will only occur for voltage overshoots caused by transmission line effects. This shows that the snubber circuit of the disclosure is only selectively activated to suppress transmission line effect overshoots and otherwise is not activated and so not consuming power.

Figure 2:
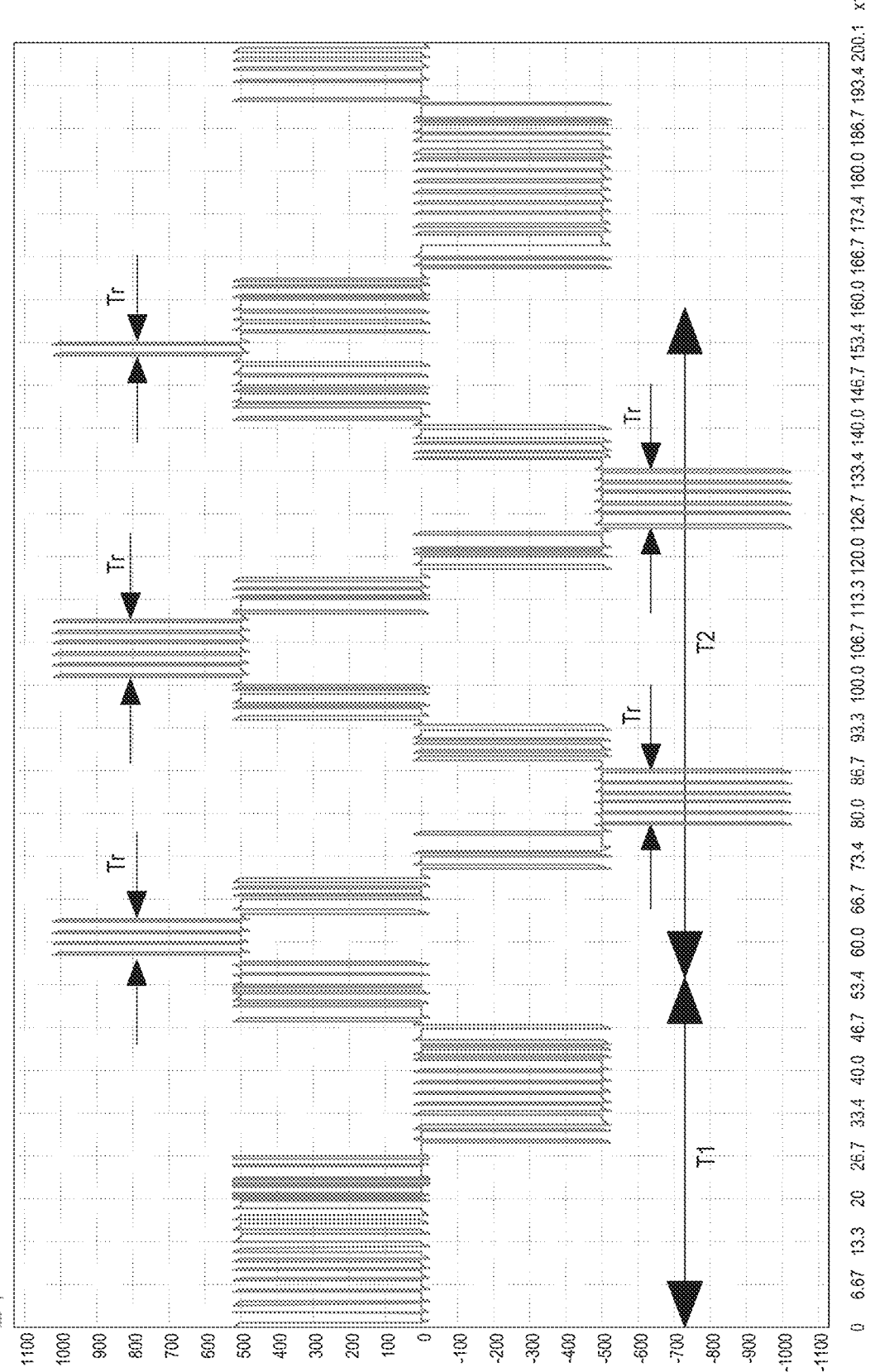
FIG. 2 is a waveform of the converter output phase to phase voltages, to describe an example according to the disclosure.
Figure 3:
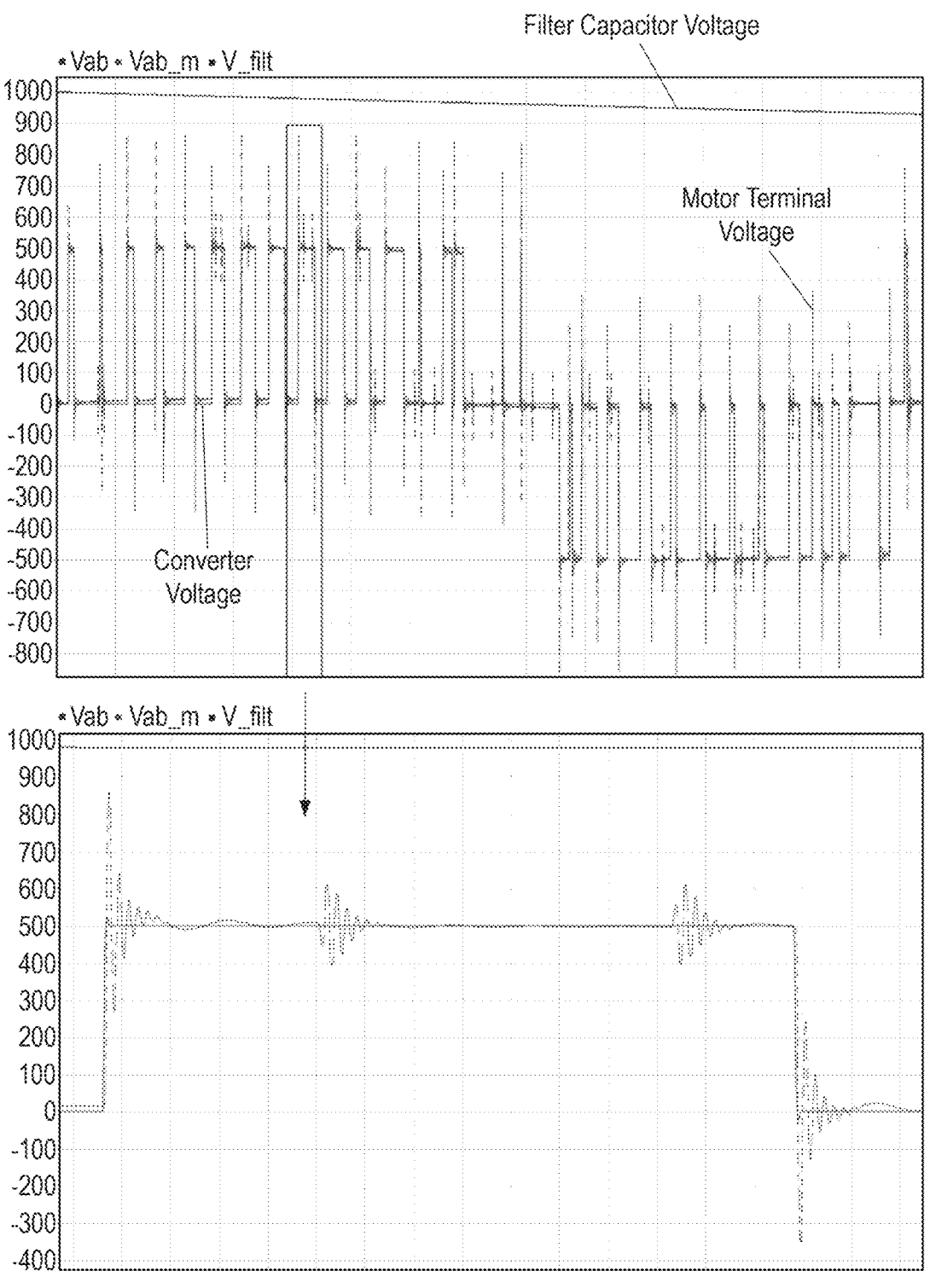
FIG. 3 shows the converter voltage, motor terminal voltage and capacitor voltage during time period T1 of FIG. 2.

The operation of the snubber circuit of the disclosure can be explained by means of an example referring to the graphs in FIGS. 2 and 3. FIG. 2 shows the phase-to-phase voltages output by the converter 2. FIG. 3 shows the converter voltage, motor terminal voltage and filter capacitor voltage during time T1 of FIG. 2.

FIG. 2 shows a phase-to-phase voltage waveform generated by a three-level inverter (also referred to herein as converter) 2 with a 1000V DC link during motor drive acceleration. During period T1, due to low modulation indexes, the converter 2 generates at its output voltages that are equal to half of the DC link voltage value. During this time, as seen in FIG. 3, since the capacitor 7 of the snubber circuit is charged to 1000V, the rectifier is not triggered and so no limitation is provided on any overshoots. Such overshoots are, however, less than 1000V and so there is no need for them to be discharged.

Figure 4:
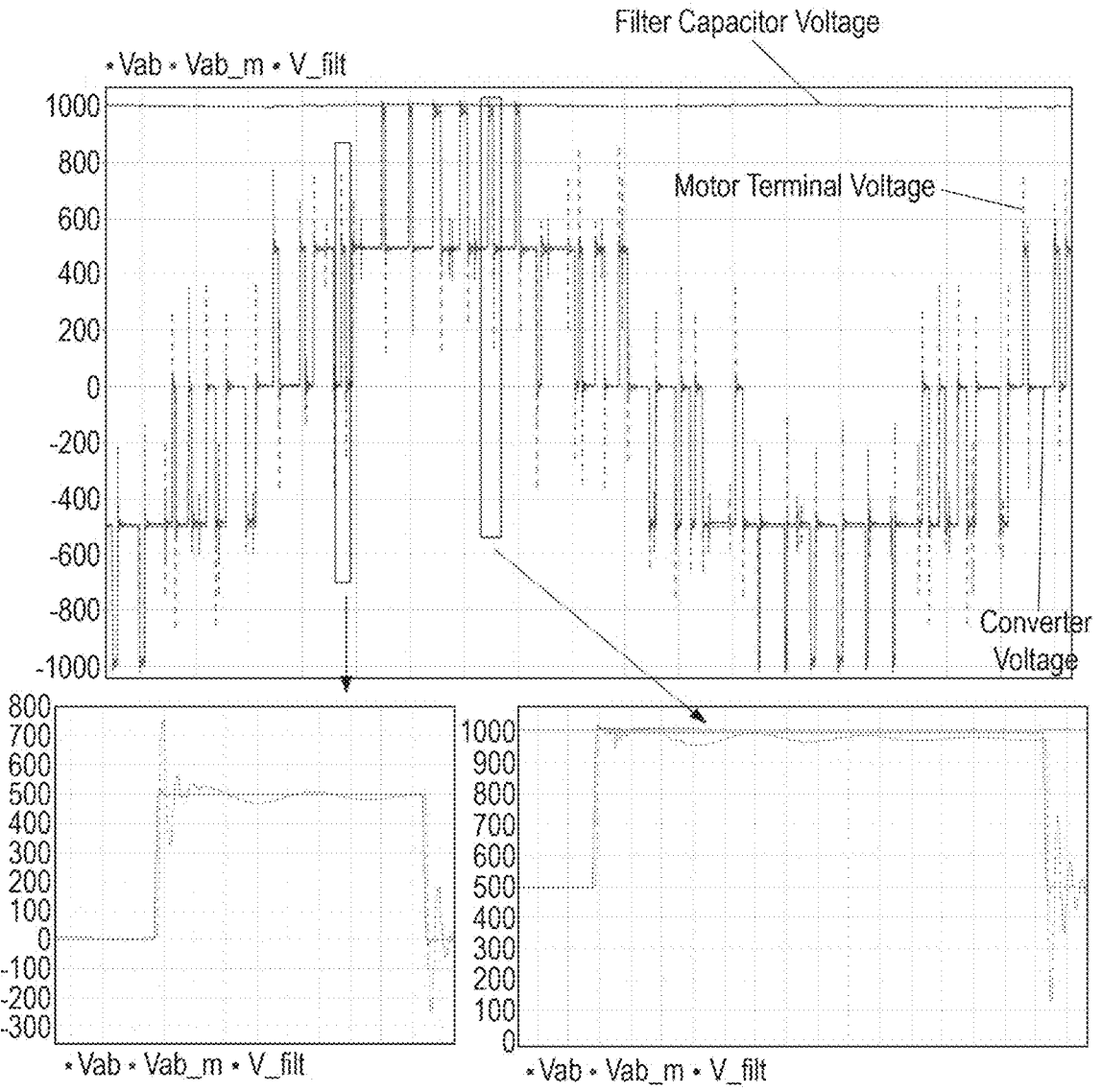
FIG. 4 shows the converter voltage, motor terminal voltage and capacitor voltage during time period T2 of FIG. 2.

During time T2, the converter 2 generates higher voltages. If the converter phase-to-phase voltages reach 1000V (and so would normally cause the voltage at the motor terminals to exceed 1000V), the rectifier 6 is activated for the short periods of time Tr when the voltage is 1000V (without a snubber this voltage will go above 1000V). The rectifier thus clamps the phase-to-phase voltage at these times and excessive energy is stored in the snubber capacitor 7 such that the phase-to-phase voltage at the motor terminals do not exceed the capacitor voltage. This effect is seen in FIG. 4 which shows the converter voltage, motor terminal voltage and filter capacitor voltage during time T2 of FIG. 2.

Because of this selective operation/activation, the rectifier diodes 6a, 6b are only working for those short periods of time Tr and only for rising edges of the converter phase-to-phase voltages, and so they do not dissipate much power. The main power is dissipated by the load 8.

The load 8 may be fully passive e.g. in the form of a resistor as shown in FIG. 1, which provides a simple arrangement which does not require any intelligence at the input stage. In other embodiments, however, the load may be active and only dissipate power of the voltage stored across the capacitor 7 is greater than the DC link voltage of the assembly. This embodiment would allow for even more selective snubbing and lower loss and the energy acquired by such a load 8 can be either dissipated or used for some other function or purpose.

As mentioned above, the resistor 9 is optional, and can facilitate reduction of inrush current. If this component is not present, all energy would be stored in the capacitor as described above. If resistor 9 is present in series with the capacitor 7, the snubber acts as a self-commutating RC snubber.

The assembly according to the disclosure has the advantage that the snubber circuit selectively captures only those overshoots that are likely to cause damage to the motor isolation, thus reducing power consumption/losses compared to known solutions. The solution also has improved robustness since it allows the capacitor to operate at constant voltage. The circuit is also relatively small, lightweight and inexpensive.

The description is of preferred embodiments only. The scope of protection is defined by the claims.

The invention claimed is:

1. A snubber circuit to mitigate voltage overshoot in a power train for driving a motor, the power train comprising a power supply, a power converter connected to the power supply, and one or more long transmissions lines from the power converter to the motor that connect the output of the power supply to the motor, the snubber circuit configured to be connected to a terminal of the motor between the one or more long transmission lines and the motor, the snubber circuit comprising:
   a rectifier;
   a link capacitor connected across an output of the rectifier; and
   a load connected across the capacitor;
   wherein the capacitor is rated to charge to a predetermined link voltage and wherein only when an input voltage to the rectifier exceeds the link voltage the snubber circuit is activated by an output of the power converter to cause the rectifier to clamp the voltage at the motor terminal to the link voltage and for excess energy from the input voltage to be stored in the link capacitor and dissipated by the load.

2. A snubber circuit according to claim 1, further comprising a resistor in series with the capacitor connected across the rectifier output.

3. A snubber circuit according to claim 1, wherein the rectifier is a 6-pulse rectifier.

4. A snubber circuit according to claim 1, wherein the load is a passive load.

5. A snubber circuit according to claim 1, wherein the load is an active load.

6. A power train for driving a motor, the power train comprising:
   a snubber circuit as claimed in claim 1;
   the power supply;
   the power converter connected to drive the motor via the one or more long transmission lines;
   wherein the snubber circuit is connected between the one or more long transmission lines and a terminal of the motor.

7. A power train according to claim 6, wherein the converter is a PWM converter.

* * * * *